(12) United States Patent
Gardner

(10) Patent No.: US 6,374,233 B1
(45) Date of Patent: *Apr. 16, 2002

(54) METHOD AND APPARATUS FOR EVALUATING EXPRESSIONS WITH CANCELLATION OF REQUESTS FOR OPERANDS THAT ARE NO LONGER REQUIRED

(75) Inventor: Paul Anton Richardson Gardner, Burnham (GB)

(73) Assignee: International Computers Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/324,216

(22) Filed: Jun. 2, 1999

(30) Foreign Application Priority Data

Jul. 28, 1998 (GB) .............................................. 9816303

(51) Int. Cl.[7] .......................... G06F 17/30; G06F 13/00; G06F 9/00
(52) U.S. Cl. ............................ 707/2; 709/100; 709/223
(58) Field of Search ............................ 706/45–47, 925; 707/2–5, 7; 709/100, 223, 243, 314, 224, 228; 717/6–7; 712/245, 236, 222, 223; 708/204, 205; 711/123, 150–155

(56) References Cited

U.S. PATENT DOCUMENTS

| | | | | |
|---|---|---|---|---|
| 5,283,856 A | * | 2/1994 | Gross et al. | 706/47 |
| 5,485,612 A | * | 1/1996 | Ota et al. | 709/100 |
| 5,668,984 A | * | 9/1997 | Taborn et al. | 712/222 |
| 5,832,224 A | * | 11/1998 | Fehskens et al. | 709/223 |
| 6,205,441 B1 | * | 3/2001 | Al-omari et al. | 707/2 |

\* cited by examiner

Primary Examiner—Thomas Black
Assistant Examiner—Te Yu Chen
(74) Attorney, Agent, or Firm—Lee, Mann, Smith, McWilliams, Sweeney & Ohlson

(57) ABSTRACT

A method for evaluating an expression comprises issuing parallel requests to acquire a plurality of operands. If, upon receipt of a first subset of the operands, it is determined that a second subset of the operands is no longer required in respect of a particular time span, the request for the second subset cancelled for that particular time span. If one operand contains an error indication for a particular time span, the method continues with the request for the other operand for that particular time span, and returns an "error" for that particular time span only if the request for the other operand is not cancelled.

17 Claims, 4 Drawing Sheets

METHOD AND APPARATUS FOR EVALUATING EXPRESSIONS WITH CANCELLATION OF REQUESTS FOR OPERANDS THAT ARE NO LONGER REQUIRED

BACKGROUND OF THE INVENTION

This invention relates to an apparatus and method for processing data.

Data processing frequently involves the evaluation of expressions, formed by combining operand values and operators according to defined rules of syntax. For example, the expression (A and B) or (not C) involves operand values A, B and C and logical operators "and", "or" and "not". The evaluation of an expression returns a result value, which in the above example will be either "true" or "false".

In many data processing applications, the length of time taken to acquire an operand value cannot be predicted. In some cases, a value may be available in milliseconds (for example where it is already held in cache memory) while in other cases it may take weeks (for example, where information from a customer has to be obtained by post).

The object of the present invention is to provide a novel apparatus and method for efficiently handling expressions which are subject to such unpredictability.

SUMMARY OF THE INVENTION

According to the invention a data processing method comprises:

(a) issuing parallel requests to acquire a plurality of operands for evaluating an expression, (b) detecting, upon receipt of a first subset of the operands, whether a second subset of the operands is still required to evaluate the expression, and (c) if the second subset is no longer required, cancelling the request for the second subset.

The invention also includes data processing apparatus for performing this method.

DESCRIPTION OF AN EMBODIMENT OF THE INVENTION

One data processing apparatus and method in accordance with the invention will now be described by way of example with reference to the accompanying drawings.

Figure 1:
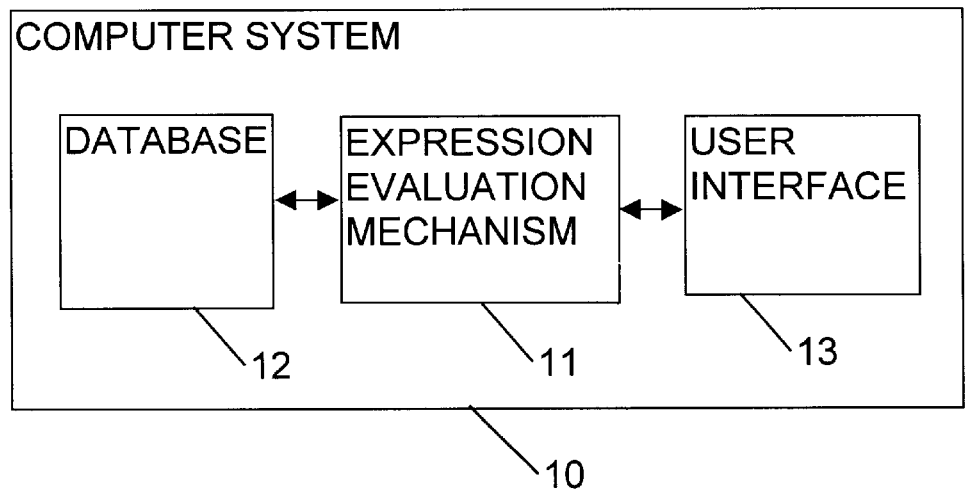
FIG. 1 is a block diagram of a data processing apparatus including an expression evaluation mechanism.

Referring to FIG. 1, this shows a computer system 10, including an expression evaluation mechanism 11, a database 12, and a user interface 13. The mechanism 11 may be a special-purpose hardware unit, but in this example it comprises conventional computer processing hardware running special-purpose software to evaluate expressions. The evaluation mechanism 11 receives one or more operand values, either from literals in the expression, or from the database, or from the user interface, and produces one or more result values. The result values may then be entered into the database, and/or presented to the user by way of the user interface.

As will be described, each of the operand values is temporally scoped: that is, it contains a history of the values of the thing that it represents. The expression evaluation mechanism takes account of the time variation of the operands, and produces a result value which is also temporally scoped.

In general, the length of time taken to acquire an operand value cannot be predicted. In some cases, a value may be available in milliseconds (for example where it is already held in cache memory) while in other cases it may take weeks (for example, where information from a customer has to be obtained by post). As will be described, the present system adopts an eager but non-strict evaluation approach. By this is meant that an expression is evaluated in an eager way (e.g. both arguments of an "and" operator are evaluated in parallel), and as soon as sufficient information is available to determine whether any part of the evaluation is not required (e.g. one of the arguments of the "and" operator is found to be false), the unwanted activity is aborted.

Each operand or result value is represented by a sequence of one or more value instances. Each value instance consists of a tuple:

{"v", time_start, time_end}.

The "v" field contains a data item which is an instance of one of a number of primitive data types, such as integer, decimal number, string, list, or date.

The time_start field indicates the start of the time span for which the data item is valid.

The time_end field indicates the end of the time span for which the data item is valid.

The tuple may also contain further information (not shown), such as a field indicating the source of the information in the tuple, or the degree of confidence in the reliability of the information.

In the present example, time_start and time_end are defined in a simple date format (dd/mm/yyyy). The time spans are inclusive of the start and end dates. Special date values "top" and "bottom" are reserved to denote hypothetical maximum and minimum dates.

The value instances within a value are time-ordered such that the most recent value instances come first, although this ordering could be reversed. However, the most-recent-first ordering is a better fit with many usage scenarios. For example, more recent data is likely to be more accurate and relevant.

For example, a person's salary might be represented by the following sequence of tuples:

{{6000, Jun. 5, 1994, top}, {0, Feb. 1, 1994, May 5, 1994}, {5000, Feb. 1, 1990, Jan. 1, 1994}}

This indicates that the person's salary was 5000 from Jan. 2nd, 1990 to Jan. 1st, 1994, zero from Jan. 2nd, 1994 to May 5th, 1994, and 6000 from May 6th, 1994 onwards.

A value may be undefined in a particular time span, for one of the following reasons:

The object to which the value relates did not exist in that time span. For example, a person's date of birth is undefined for the period prior to that date.

The value instance for that time span has not been determined yet.

A value instance has been deleted.

For instance, in the above example, the value of the salary is undefined for the period up to and including the Jan. 1st, 1990.

A value may contain one or more error value instances, indicated by an "error" code in the "v" field. Error value instances can occur as the result of computational errors (such as attempting to divide by zero) or type violations, such as attempting to perform an arithmetic operation on a string data item.

Values are combined into expressions by means of operators. Some examples of operators will now be described. All these operators take temporally-scoped values as operands, and produce temporally-scoped values as results.

Unary Operators

Unary operators (i.e. those that have just a single operand) include the logical "not" operator and the unary minus operator. Such operators are applied to each value instance of the operand in turn, to produce a result containing the same number of value instances. For example, the expression:

not {{true, Feb. 1, 1992, top}, {false, Jan. 1, 1986, Jan. 1, 1992}} returns the result:

{{false, Feb. 1, 1992, top}, {true, Jan. 1, 1986, Jan. 1, 1992}}.

Binary Operators

Binary operators (i.e. those that take two operands) include comparison operators such as ==(equal to), !=(not equal to), <(less than), >(greater than), >=(greater than or equal to), and =(less than or equal to), arithmetic operators such as +(add), −(subtract), * (multiply), / (divide), and logical operators such as "and" and "or".

The general approach to such binary operators is to take the value instances of the two operands and to combine them to produce a set of time spans in which each operand has a constant value. For example, the expression:

{{10, Jan. 1, 1990, Jan. 1, 1995}}+{{20, Jan. 1, 1980, Jan. 1, 1990}, {25, Feb. 1, 1990, Jan. 1, 1993}} returns the result: {{30, Jan. 1, 1990, Jan. 1, 1990},{35, Feb. 1, 1990, Jan. 1, 1993}}.

The operators "and", "or", "*" and "/" are non-strict, in that under certain circumstances it is not necessary to acquire both operands in order to produce a result:

In the case of the "and" operator, if either operand is found to be "false" for a particular time span, the acquisition of the other operand is abandoned in respect of that time span.

In-the case of the "or" operator, if either operand is found to be "true" for a particular time span, the acquisition of the other operand is abandoned in respect of that time span.

In the case of the "*" operator, if either operand is found to be zero for a particular time span, the acquisition of the other operand is abandoned in respect of that time span.

In the case of the "/" operator, if the first operand is found to be zero for a particular time span, the acquisition of the second operand is abandoned in respect of that time span.

For example, if one operand in an "and" expression is found to have the value

{{true, Feb. 1, 1992, top}, {false, Jan. 1, 1986, Jan. 1, 1992}} acquisition of the other operand is abandoned in respect of the time span [Jan. 1, 1986, Jan. 1, 1992], since it is known that the result must be "false" within that time span, whatever the value of the other operand. However, it is still necessary to acquire the other operand in respect of the time span [Feb. 1, 1992, top].

"If" Operator

The syntax for the "if" operator is as follows:

if <expr1> then <expr2>[else<expr3>]endif

Such expressions are evaluated by taking each value instance of <expr1>, and evaluating either <expr2> or <expr3> depending on whether that value instance is "true" or "false". The "else" branch is optional, as indicated by the square brackets.

For example, the expression:

if
   {{true, Jan. 1, 1996, Jan. 1, 1997},{false, Jan. 1, 1994, Jan. 1, 1995}}
then
   {10, bottom, top}
else
   {20, bottom, top}
endif returns the result: {{10, Jan. 1, 1996, Jan. 1, 1997},{20, Jan. 1, 1994, Jan. 1, 1995}}.

Errors

As mentioned above, a value may contain one or more error value instances. In the case of a unary operator, if the operand contains an error value instance, the operator returns an error for the relevant time span.

For example, the expression:

not {{true, Feb. 1, 1992, top}, {error, Jan. 1, 1986, Jan. 1, 1992}} returns the result:

{{false, Feb. 1, 1992, top}, {error, Jan. 1, 1986, Jan. 1, 1992}}.

In the case of the operators "==", "!=", "<", ">", ">=", "<=", "+" and "−", if one of the operands contains an error value instance, the acquisition of the other operand is abandoned in respect of the relevant time span, and the operator returns an error for that time span.

In the case of the operators "and", "or", "*" and "/", if one of the operands contains an error, the acquisition of the other operand is not abandoned. If the other operand turns out to be such that the first operand is not required to form the result, the appropriate result is returned: for example, in the case of the "and" operator, if the other operand turns out to be "false", a "false" result is returned. Otherwise, an error is returned.

In the case of the "if" operator, if <expr1> contains an error, acquisition of the other operands is abandoned and an error is returned.

Undefined Values

In the case of a unary operator, if an operand is undefined for a particular time span, the result will also be undefined for that time span.

In the case of a binary operator, if either operand is undefined for a particular time span, the result will also be undefined for that time span. However, this is overridden by an error in one of the operands relating to that time span. It is also overridden, in the case of the operators "and", "or", "*" and "/", if it is determined that the undefined operand is not required to form the result.

In the case of the "if" operator, if <expr1> is undefined for a particular time span, the result will also be undefined for that time span.

Functions

The evaluation mechanism also implements a number of functions for manipulating value instances. For example, the functions "duration" and "sum" are provided.

The "duration" function computes the duration of each value instance in an expression.

For example:

duration({{10, Jan. 1, 1995, Feb. 1, 1995},{20, Apr. 1, 1993, Apr. 1, 1993}})

returns the result:

{{"2 days", Jan. 1, 1995, Feb. 1, 1995}, {"1 day", Apr. 1, 1993, Apr. 1, 1993}}

The "sum" function calculates the sum of all individual value instances in an expression.

For example:
sum (duration ({{10, Jan. 1, 1995, Feb. 1, 1995},{20, Apr. 1, 1993, Apr. 1, 1993}}))
returns the result:
{{"3 days", bottom, top}}

Evaluation mechanism

The evaluation mechanism for evaluating expressions will now be described in more detail.

Figure 2:
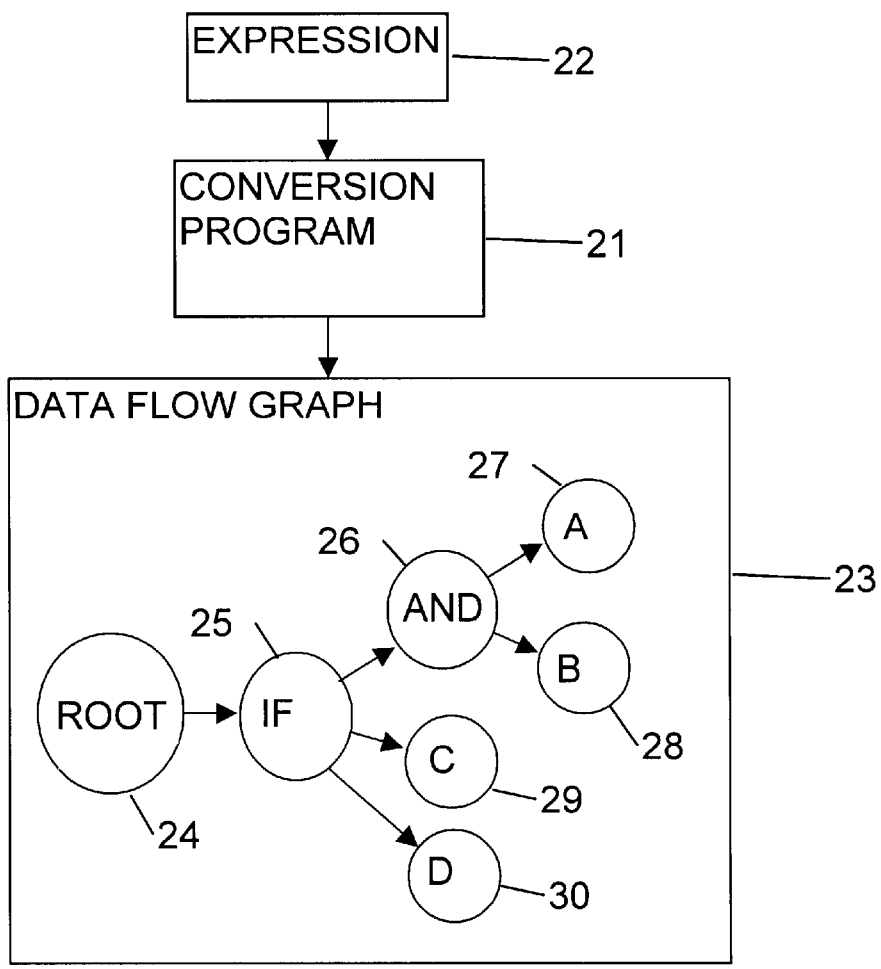
FIG. 2 shows the expression evaluation mechanism in more detail.

Referring to FIG. 2, the evaluation mechanism comprises a conversion program 21, which takes an expression 22 and converts it into a data flow graph 23. The root node of the data flow graph represents the evaluated expression. The leaf nodes represent the operand values for the expression, either as literal constants or as processes to acquire the operand values. The other nodes represent operators.

As an example, FIG. 2 shows a data flow graph generated from the expression:

if (A and B) then C else D.

This consists of a root node 24, a node 25 representing the "if" operator, a node 26 representing the "and" operator, and leaf nodes 27–30 representing the respective operands A–D. It will be appreciated that, in the case of more complex expressions, the data flow graph will be correspondingly more complex.

Two types of message are passed between nodes in the graph, Control messages and Data messages. Control messages travel away from the root node while Data messages travel towards it.

There are three types of Control message, as follows:

| Type | Parameters | Description |
| --- | --- | --- |
| Require | [$T_S$,$T_E$] | Requests the receiving node to return an operand value, for the time span specified by [$T_S$,$T_E$]. |
| Cancel | [$T_S$,$T_E$] | Informs the receiving node that the operand value is not required in the specified time span. |
| Duplicate | none | Produces a copy of the node (and recursively any children of it). |

A Data message has the form V[$T_S$,$T_E$], where V is a data value and [$T_S$,$T_E$] is the time span to which the data value applies. The data value may be an actual data value, or may be an "error" marker or a "no more data" marker. "Undefined" values are indicated by gaps between successive Data message time spans.

The evaluation process is initiated by the root node sending a Require message to its child node. The parameters [$T_S$,$T_E$] in the Require message indicate the time span for which the evaluation is to be performed. The process ends when the root node receives one or more Data messages containing the required result.

When a node representing an operator receives a Require or Cancel message from its parent node, it generally passes the message on unchanged to all its child nodes. However, some operators (not described herein) may modify the message, according to their semantics.

When a leaf node receives a Require message, it initiates a process to acquire the operand in question. If the node does not represent a literal constant, this may involve performing a database access, to obtain the value of the operand for the specified time span. Alternatively, it may involve prompting the user, by way of the user interface, to enter the value of the operand for the specified time span. In both cases the operand discovery process can be incremental with value instances being returned in time span order. For example, if a person's address is required over span [Jan. 1, 1990, Jan. 1, 1998] the current address, say London[Jan. 1, 1996, Jan. 1, 1998], could be returned as the first value instance, followed by the previous address etc. A benefit of this is that computation performed on the initial value instance may result in the rest not being required. Consider an expression that ascertains whether or not a person has lived in the UK in-the last 25 years and the request is being made to a database that maintains the current address in a database but previous addresses in offline storage. When a value instance has been acquired, the leaf node returns a Data message containing the value instance to its parent node.

Generally, a node representing an operator waits until it has received sufficient Data messages from its child nodes to enable it to return a Data message to its parent node. That is, it performs an incremental operation over time. When sufficient operands have been received, it performs the required operation, and then returns a Data message containing the result to its parent node. For example, the "+" operator waits until it has received a Data message from both operands that contain value instances that have some overlap in their time spans. However, as explained above, in certain cases a node may determine that a particular operand is no longer required for a particular time span [$T_S$,$T_E$]. In this case the node sends a Cancel message to the appropriate child node, the message containing this time span as a parameter.

When a node has completed all activity for the required time span, it returns a Data message containing the "no more data" marker to its parent.

When a leaf node receives a Cancel message, it aborts any process it has previously initiated to acquire the operand for the specified time span. This may involve aborting all or part of a database access request. Alternatively, it may involve displaying a message to the user, informing the user that a specified data value is no longer required, or is now required only in respect of a more limited time period.

"And" node

As an example, the "and" node 26 will now be described in more detail. The node 26 receives a Require message from its parent node 25, and receives Data messages from its child nodes 27,28. The node 26 simply passes Require messages unchanged to both its child nodes. Cancel messages are handled in a similar way.

Figure 3:
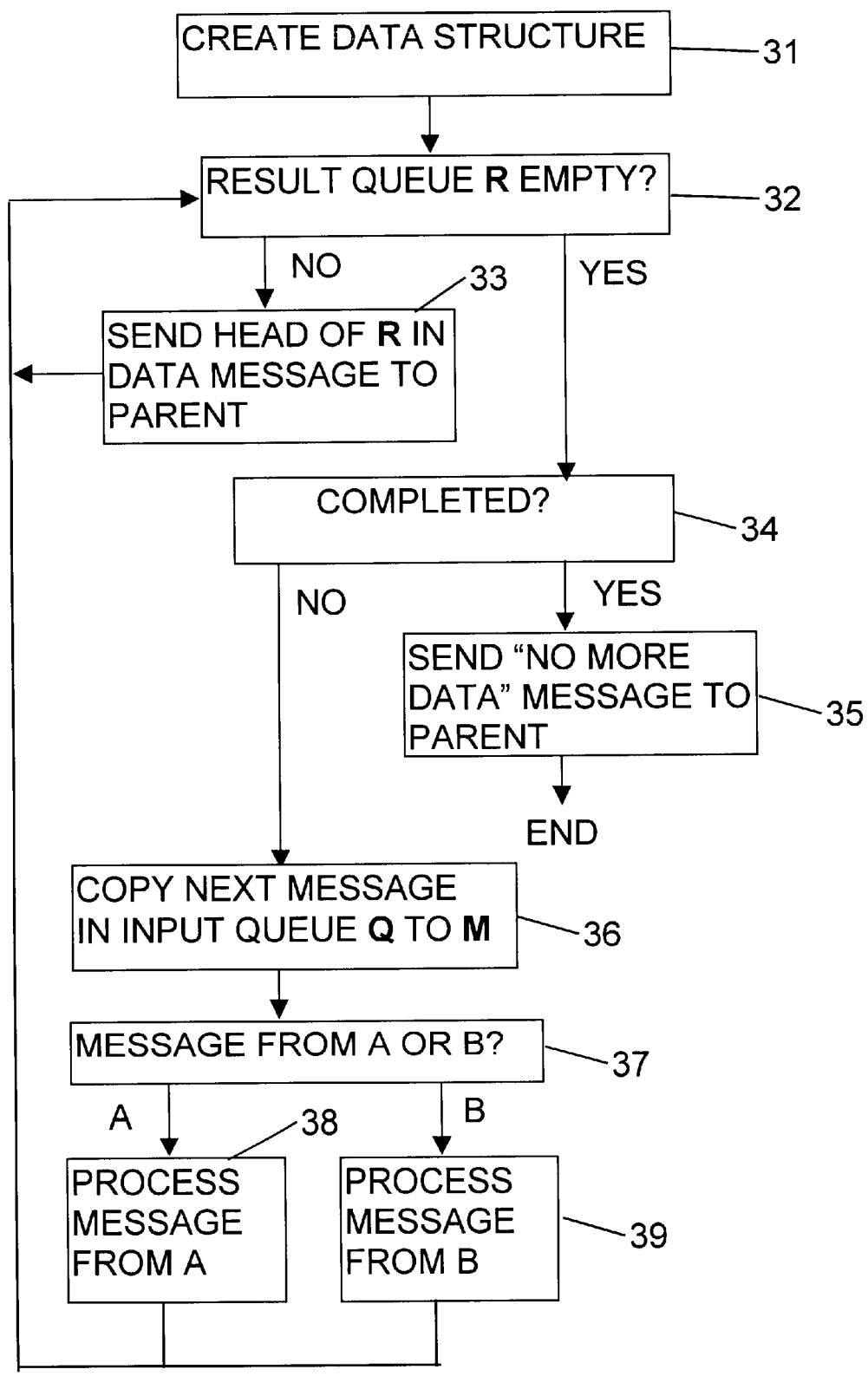
FIGS. 3 to 5 are flow charts showing the implementation of an "and" operator.

Data messages are handled by means of a process within the "and" node, which will now be described with reference to FIG. 3.

(Step 31) The process first creates a data structure as follows:

| | |
| --- | --- |
| Va, Vb | Vectors for holding the value instances of the two operands A and B. Initially, these vectors are both empty. |
| Q | An input queue for holding Data messages received from the child nodes. |
| R | A result queue for holding Data messages to be returned to the parent node. |
| Completed | A boolean variable, indicating whether processing is complete. The initial value of this variable is "false". |
| La, Lb | Variables for holding the last Data messages received from nodes A and B (or computed to fill gaps). The initial values of each of these variables is "null". |

(Step 32) The process then enters a loop (Steps 32–39). The first action in this loop is to check whether the result queue R is empty.

(Step 33) If the result queue R is not empty, the process removes the head item from this queue, sends it in a Data message to the parent node and returns to step 32.

(Step 34) The process then checks whether Completed is true.

(Step 35) If Completed is true, the process sends a Data message containing a "no more data" marker to the parent node. It then breaks out of the loop, and terminates.

(Step 36) If, on the other hand, Completed is false, the process continues as follows. First, it copies the next Data message in the input queue Q to a current message M.

(Step 37) The process then checks whether this message was from child node A or B, and goes to Step 38 or 39 according to the result. It then returns to Step 32 above, to continue with the loop.

Figure 4:
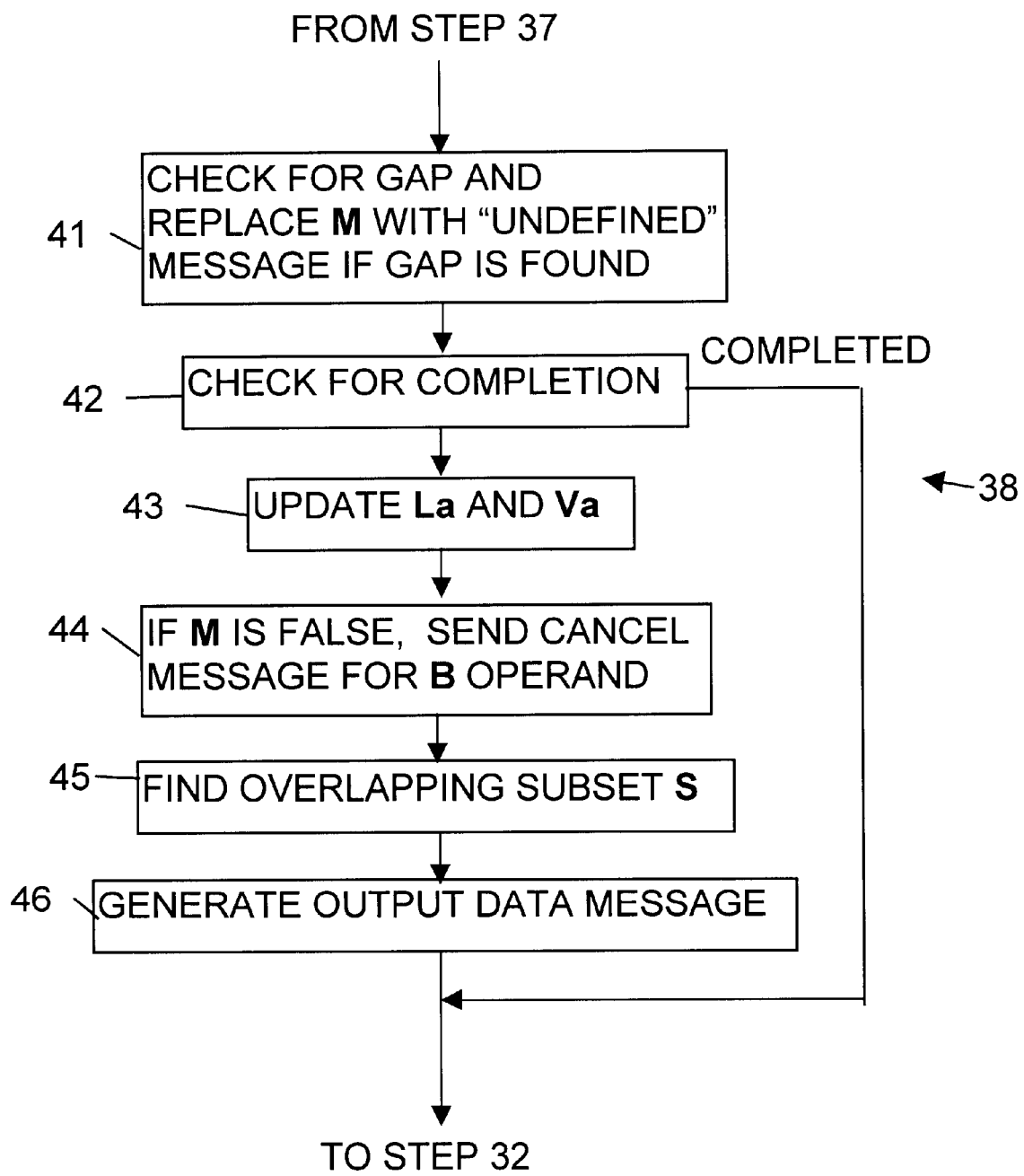

FIG. 4 shows Step 38 above in more detail. Step 39 is similar, except that it is the mirror image of step 38 with regard to the operands A and B, variables La and Lb, and vectors Va and Vb.

Figure 5:
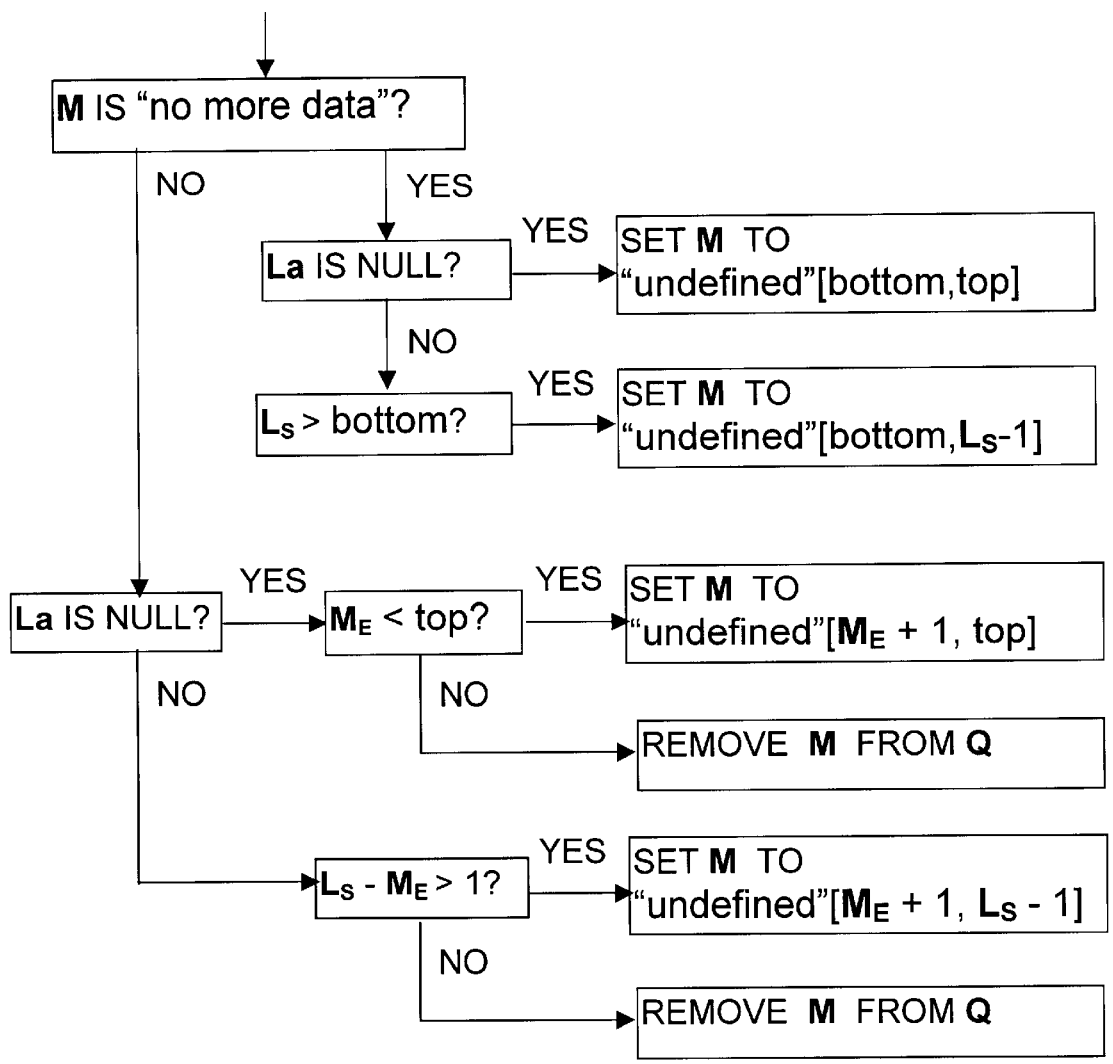

(Step 41) The process looks for gaps between the time spans of the messages received from node A. If it finds such a gap, it replaces the current message M with an "undefined" message, with start end times equal to the start and end times of the gap. FIG. 5 shows Step 41 in more detail. In the following description, $M_S$ and $M_E$ represent the start and end times of the current message M, while $L_S$ and $L_E$ represent the start and end times of the previous message La received from node A. (It should be recalled that in this example the data is being processed in reverse time order, starting with the most recent value instances, and so the "previous" message La actually relates to a later time span).

The following can be seen from FIG. 5:

If M is a "no more data" message, and La is null, the operand A is undefined for all times, and so the message M is set to "undefined" [bottom, top].

If M is a "no more data" message, and La is not null, and $L_S$ is greater than the minimum time value "bottom", the operand A is undefined for all times up to $L_S$. In this case the message M is set to "undefined" [bottom, $L_S-1$].

If M is not a "no more data" message, and La is null, and $M_E$ is less than the maximum time value "top", the operand A is undefined for all times beyond $M_E$. In this case, the message M is set to "undefined" [$M_E+1$, top].

If M is not a "no more data" message, and La is not null, and $L_S-M_E>1$, there is a gap between the messages M and La, during which the operand A is undefined. In this case, the message M is set to "undefined" [$M_E+1$, $L_S-1$].

Otherwise, there is no gap between the messages and the data message M is removed from the input queue Q. Note, however, that if there was a gap, the data message M is left in Q, so that it can be processed the next time round the loop.

(Step 42) Referring again to FIG. 4, if the message M is a "no more data" message then Completed is set depending on whether a "no more data" message has previously been received from B. This indicates whether or not all the required operand data has now been received from both A and B. Step 32 is then returned to.

(Step 43) The process then replaces the variable La with the message M, and adds the message M to the vector Va.

(Step 44) The process then checks whether the value $M_V$ of M is "false". If so, it sends a Cancel message with parameters [$M_S,M_E$] to node B. In other words, if the returned value of operand A is "false" for a particular time span, the acquisition of operand B is cancelled in respect of that time span.

(Step 45) The process next finds the subset S of the vector Vb received from node B, which overlaps with the time span [$M_S,M_E$] of the current message M. This subset S will consist of a set of zero or more value instances E.

(Step 46) The process then performs a loop in which it does the following for each value instance E of the subset S in turn.

(In the following, $E_V$ and [$E_S,E_E$] represent the value and time span of the value instance E, and $M_V$ represents the value of the current message M).

If either $E_V$ or $M_V$ is false, a Data message "false" [$E_S,E_E$] is inserted into the result queue R.

Otherwise, if either $E_V$ or $M_V$ is an error value, a Data message "error" [$E_S,E_E$] is inserted into the result queue R.

Otherwise, if either $E_V$ or $M_V$ is an undefined value, no action is required: this leaves a gap in the result queue R, corresponding to the time span for which the value is undefined.

Otherwise, if either $E_V$ or $M_V$ is not a boolean value, then a type violation has occurred. In this case a Data message "error" [$E_S,E_E$] is inserted into the result queue R.

Otherwise, a Data message "true" [$E_S,E_E$] is inserted into the result queue R.

As stated above, the operation is similar in the case of a message received from node B.

In summary, it can be seen that the "and" node examines each of the operands to find value instances in the respective operands whose time spans overlap, and then generates an output data message in respect of each overlap period. If the returned value of either operand is "false" for a particular time span, the acquisition of the other operand is cancelled in respect of that time span.

Some possible modifications

It will be appreciated that many modifications may be made to the system described above without departing from the scope of the present invention. For example, expressions may be temporally scoped as well as data.

What is claimed is:

1. A data processing method comprising the steps:

(a) inputting to an evaluation unit an expression defining an operator and a plurality of operands, said operands comprising at least a first subset of operands and a second subset of operands;

(b) operating said evaluation unit to issue parallel requests for said operands;

(c) in response to said parallel requests, initiating a plurality of parallel acquisition processes to acquire said operands;

(d) operating said evaluation unit, upon receipt of said first subset of operands, to determine whether said second subset of operands is still required for evaluating the expression;

(e) in the event that the evaluation unit determines that said second subset of operands is no longer required for evaluating the expression, operating said evaluation unit to cancel the request for said second subset of operands; and (f) operating said evaluation unit to evaluate said expression.

2. A data processing method according to claim 1 including:
   (a) converting an expression into a data flow graph, including a root node representing the result of the evaluation, leaf nodes representing the operands, and intermediate nodes representing operators;
   (b) propagating a Require message through the data flow graph towards the leaf nodes, the Require message indicating which operands are required;
   (c) when a Require message reaches a leaf node, acquiring an operand, and propagating a Data message through the data flow graph towards the root node, the Data message including an operand value acquired by the leaf nodes; and
   (d) when a Data message reaches an intermediate node, determining whether an operand is still required by that node and, if the operand is no longer required, propagating a Cancel message through the data flow graph towards the leaf nodes.

3. A data processing method according to claim 1, wherein
   (a) each of the operands comprises a sequence of one or more value instances, each value instance including a data item, a start time, and an end time, the start time and end time defining a time span for which the data item is valid; and
   (b) in the event that the evaluation unit determines that said second subset of operands is no longer required for evaluating the expression in respect of a particular time span, operating said evaluation unit to cancel the request for said second subset of operands in respect of said particular time span.

4. A data processing method according to claim 1, wherein:
   (a) said operator comprises a logical "and" operator, having two operands; and
   (b) in the event that either operand is "false" for a particular time span, operating said evaluation unit to cancel the request for the other operand for said particular time span, and returning a "false" result for that particular time span.

5. A data processing method according to claim 1, wherein:
   (a) said operator comprises a logical "or" operator, having two operands; and
   (b) in the event that either operand is "true" for a particular time span, operating said evaluation unit to cancel the request for the other operand for said particular time span, and returning a "true" result for that particular time span.

6. A data processing method according to claim 1, wherein:
   (a) said operator comprises an arithmetic "multiply" operator, having two operands; and
   (b) in the event that either operand is zero for a particular time span, operating said evaluation unit to cancel the request for the other operand for said particular time span, and returning a zero result for that particular time span.

7. A data processing method according to claim 1, wherein:
   (a) said operator comprises an-arithmetic "divide" operator, having two operands, namely a dividend and a divisor; and
   (b) in the event that the dividend is zero for a particular time span, operating said evaluation unit to cancel the request for the divisor for said particular time span, and returning a zero result for that particular time span.

8. A data processing method according to claim 1 including:
   (a) operating the evaluation unit, in the event an error indication in connection with one of said operands for a particular time span, to continue with a request for another of said operands for that particular time span; and
   (b) operating said evaluation unit, upon receipt of said another of said operands, to determine whether said one of said operands is still required for evaluating the expression;
   (c) in the event that the evaluation unit determines that said one of said operands is no longer required for evaluating the expression, operating said evaluation unit evaluate said expression even though said error indication has occurred.

9. A data processing apparatus comprising:
   (a) an evaluation unit for evaluating expressions;
   (b) at least one operand acquisition unit;
   (c) means for inputting to said evaluation unit an expression defining an operator and a plurality of operands, said operands comprising at least a first subset of operands and a second subset of operands;
   (d) said evaluation unit comprising means for issuing parallel requests for said operands to said operand acquisition unit;
   (e) said operand acquisition unit comprising means responsive to said parallel requests, for initiating a plurality of parallel acquisition processes to acquire said operands and for returning said operands to said evaluation unit;
   (f) said evaluation unit including means operative upon receipt of said first subset of operands, for determining whether said second subset of operands is still required for evaluating the expression;
   (g) said the evaluation unit also including means operative when said second subset of operands is no longer required, for sending a message to said operand acquisition unit, canceling the request for said second subset of operands.

10. Data processing apparatus according to claim 9 wherein the evaluation unit comprises:
    (a) means for converting an expression into a data flow graph, including a root node representing the result of the evaluation, leaf nodes representing the operands, and intermediate nodes representing operators;
    (b) means for propagating Require messages through the data flow graph towards the leaf nodes, the Require messages indicating which operands are required;
    (c) the leaf nodes comprising means for acquiring operands in response to the Require messages, and means for propagating Data messages through the data flow graph towards the root node, the Data messages including operand values acquired by the leaf nodes; and
    (d) the intermediate nodes comprising means for determining whether an operand that has not yet been returned in a Data message is still required and, if an operand is no longer required, propagating Cancel messages through the data flow graph towards the leaf nodes.

11. A data processing apparatus according to claim 9, wherein
    (a) each of the operands comprises a sequence of one or more value instances, each value instance including a data item, a start time, and an end time, the start time and end time defining a time span for which the data item is valid; and (b) said evaluation unit includes means operative when said second subset of operands is no longer required for evaluating the expression in respect of a particular time span, for sending a message to said operand acquisition unit, canceling the request for said second subset of operands in respect of said particular time span.

12. A data processing apparatus according to claim 9, wherein:

(a) said operator comprises a logical "and" operator, having two operands; and (b) said evaluation unit includes means operative in the event that either operand is "false" for a particular time span, for canceling the request for the other operand for said particular time span, and returning a "false" result for that particular time span.

13. A data processing apparatus according to claim 9, wherein:

(a) said operator comprises a logical "or" operator, having two operands; and (b) said evaluation unit includes means operative in the event that either operand is "true" for a particular time span, for canceling the request for the other operand for said particular time span, and returning a "true" result for that particular time span.

14. A data processing apparatus according to claim 9, wherein:

(a) said operator comprises an arithmetic "multiply" operator, having two operands; and (b) said evaluation unit includes means operative in the event that either operand is zero for a particular time span, for canceling the request for the other operand for said particular time span, and returning a zero result for that particular time span.

15. A data processing apparatus according to claim 9, wherein:

(a) said operator comprises an arithmetic "divide" operator, having two operands, namely a dividend and a divisor; and (b) said evaluation unit includes means operative in the event that the dividend is zero for a particular time span, for canceling the request for the divisor for said particular time span, and returning a zero result for that particular time span.

16. A data processing apparatus according to claim 9, wherein:

(a) said evaluation unit includes means operative, in the event an error indication in connection with one of said operands for a particular time span, for continuing with a request for another of said operands for that particular time span; and (b) said evaluation unit includes means operative, upon receipt of said another of said operands, for determining whether said one of said operands is still required for evaluating the expression;

(c) said evaluation unit includes means operative in the event that said one of said operands is no longer required for evaluating the expression, for evaluating said expression even though said error indication has occurred.

17. A data carrier incorporating a computer program for performing a method comprising the steps:

(a) inputting to an evaluation unit an expression defining an operator and a plurality of operands, said operands comprising at least a first subset of operands and a second subset of operands;

(b) operating said evaluation unit to issue parallel requests for said operands;

(c) in response to said parallel requests, initiating a plurality of parallel acquisition processes to acquire said operands;

(d) operating said evaluation unit, upon receipt of said first subset of operands, to determine whether said second subset of operands is still required for evaluating the expression;

(e) in the event that the evaluation unit determines that said second subset of operands is no longer required for evaluating the expression, operating said evaluation unit to cancel the request for said second subset of operands; and (f) operating said evaluation unit to evaluate said expression.

* * * * *